United States Patent [19]
Kaelin

[11] 3,807,566
[45] Apr. 30, 1974

[54] REFUSE AND SLUDGE TREATMENT PLANT

[76] Inventor: Joseph Richard Kaelin, Villa Seeburg, 6374 Buochs, Switzerland

[22] Filed: July 31, 1972

[21] Appl. No.: 276,684

[30] Foreign Application Priority Data
July 30, 1971 Switzerland.................. 11231/71

[52] U.S. Cl.................. 210/201, 210/220, 210/322
[51] Int. Cl............................................. B01d 21/24
[58] Field of Search........................... 210/150–152, 210/322, 330, 405, 520, 220, 201

[56] References Cited
UNITED STATES PATENTS

| | | | |
|---|---|---|---|
| 924,285 | 6/1909 | Smith................................. | 210/322 |
| 3,545,615 | 12/1970 | Duffield......................... | 210/405 X |
| 3,594,316 | 7/1971 | Mersmann et al............. | 210/405 X |
| 2,430,519 | 11/1947 | Mallory.......................... | 210/220 X |
| 3,595,783 | 7/1971 | Pflanz et al...................... | 210/220 |

*Primary Examiner*—John Adee
*Attorney, Agent, or Firm*—Pierce, Scheffler & Parker

[57] ABSTRACT

In a plant for the treatment of refuse and sludge, the plant comprising a treatment device and means for supplying to the treatment device sludge and refuse to be treated and means for removing the material treated in the treatment device, the treatment device has a circular-shaped reception part provided with at least one treatment chamber extending in its peripheral direction to receive the sludge and refuse to be treated, the treatment chamber being connected to ventilating means to ventilate the material to be treated, the said supply and removal means being adapted for movement relative to the circular reception part in rigid correlation with each other; the removal means being arranged to remove treated material from the treatment chamber at a place which seen in the direction of movement is remote from the supply means.

13 Claims, 6 Drawing Figures

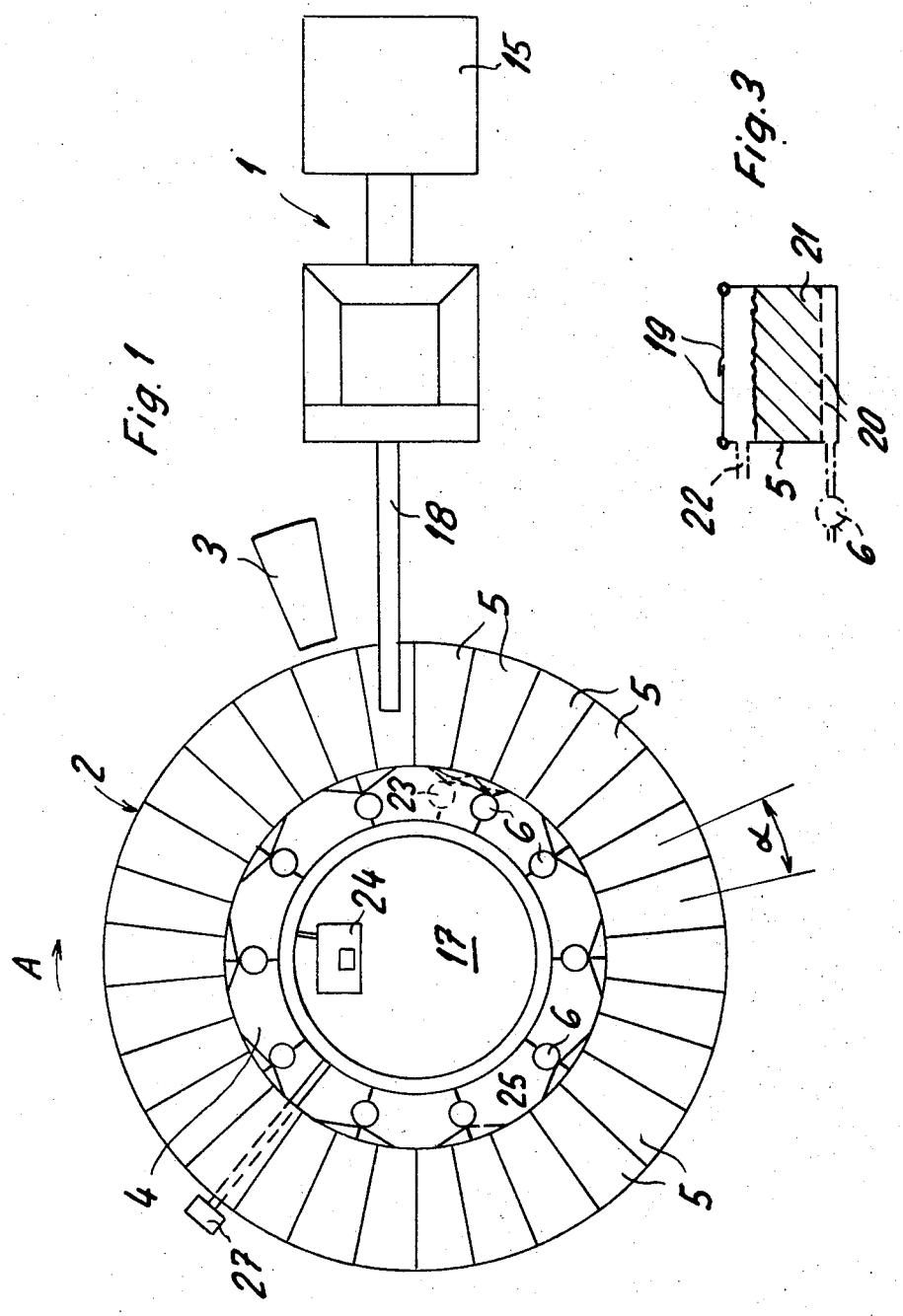

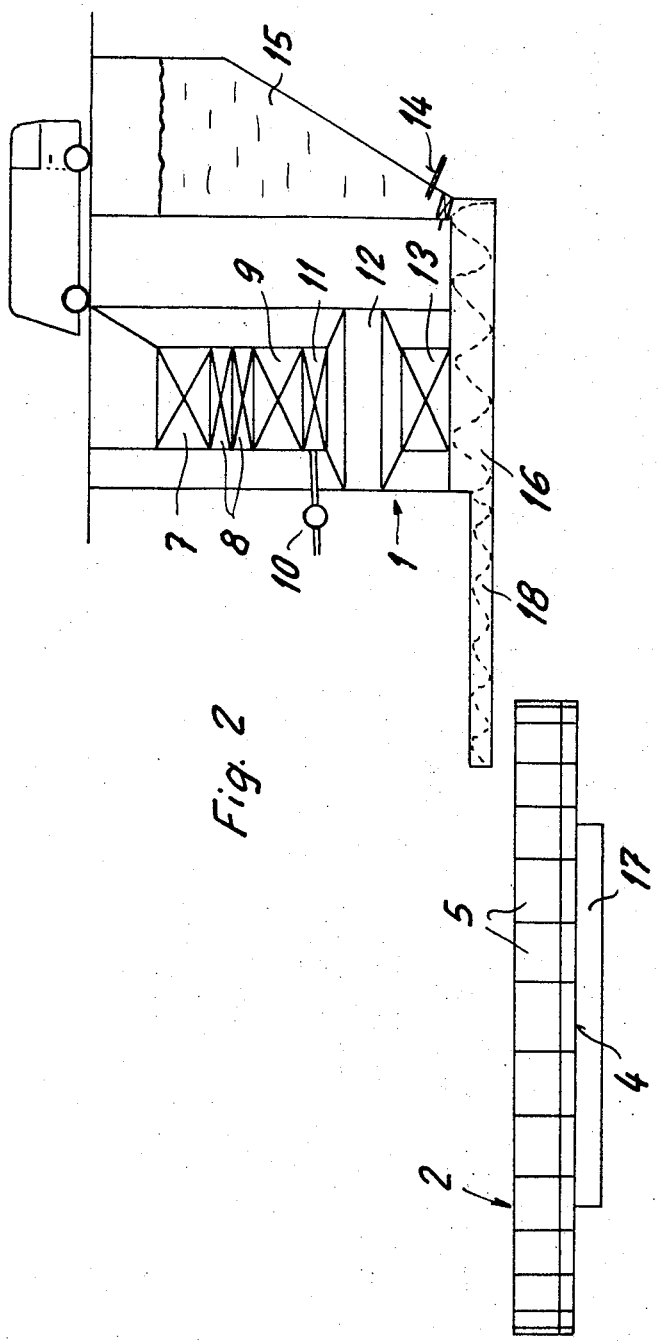
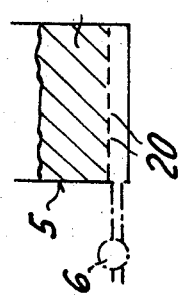

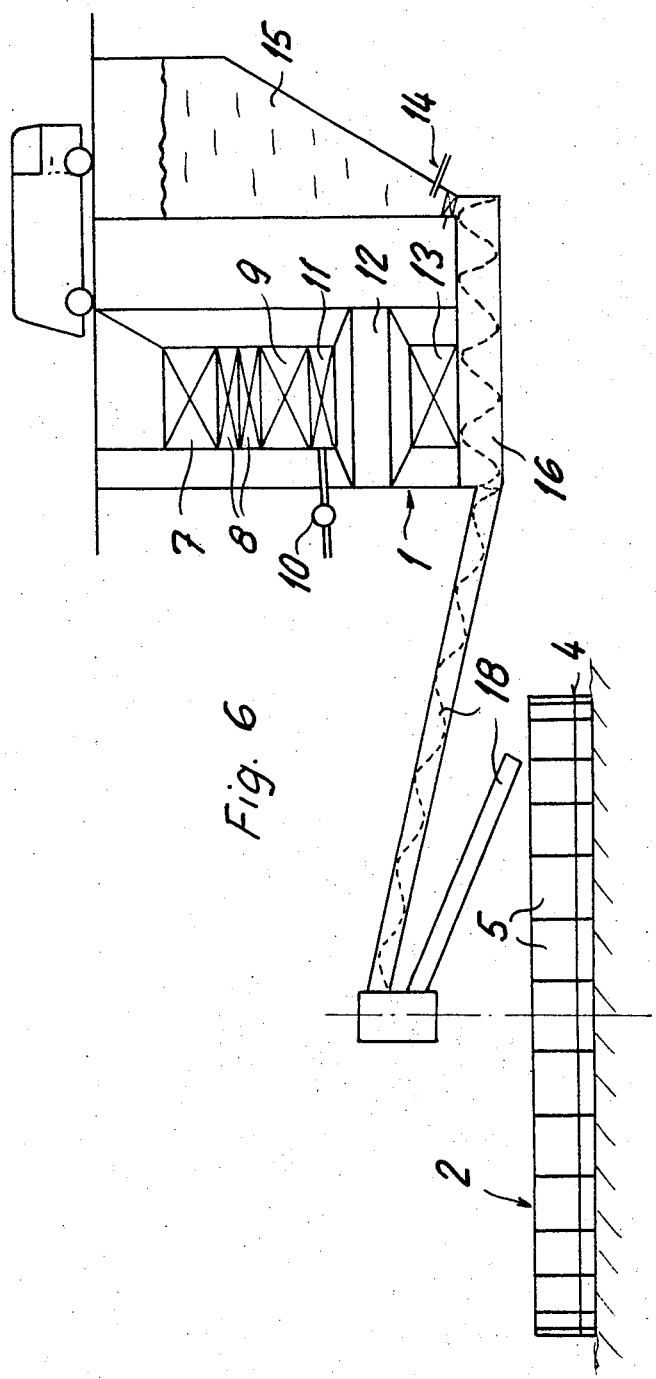

REFUSE AND SLUDGE TREATMENT PLANT

The present invention relates to a refuse and sludge treatment plant.

Refuse and sludge treatment plants are already known, but these have the drawback that they have no ventilation by means of oxygen, so that even though the refuse and sludge is retained for a long time in the plant, practically no biological process occurs in the refuse and sludge and the resulting mixture reaches low temperatures, the result of this being that the resulting compost is not sterile. There are also considerable problems in selling compost. In addition, the investment costs required for normal compost plants are much too high compared with the output available from them.

Refuse and sludge treatment plants are also known which work on a biological basis with aeration, but they are much too expensive to design and operate. As the refuse-sludge mixture which is to be treated in these plants is rolled over time and again during ventilation and the resultant biological decomposition, the biological process is also subjected to considerable disruption. There are also plants where the sludge-refuse mixture is aerated in the resting position. However, these plants have the drawback that they are relatively complicated in design and cannot be operated automatically, as a result of which they become uneconomical.

An object of the invention is to provide a sludge and refuse treatment plant which does not have the drawbacks referred to above of previously known plants and in which the refuse-sludge mixture which is to be treated is not moved during ventilation and the resultant biological decomposition relative to its base.

According to the invention there is provided a refuse and sludge treatment plant comprising a treatment device, means for supplying to the treatment device sludge and refuse to be treated and means for removing the material treated in the treatment device, wherein the treatment device has a circular-shaped reception part provided with at least one treatment chamber extending in its peripheral direction to receive the sludge and refuse to be treated, the treatment chamber being connected to ventilating means to ventilate the material to be treated, the said supply and removal means being adapted for movement relative to the circular reception part in rigid correlation with each other; the removal means being arranged to remove treated material from the treatment chamber at a place which seen in the direction of movement is remote from the supply means.

It is thus possible that the supply and removal means are housed adapted to move along the circular-shaped reception part or that the reception part itself is rotatably housed.

It is expedient if the reception part is provided with a plurality of treatment chambers arranged one behind the other in its peripheral direction and extending in the latter. In this way the individual treatment chambers can be filled or emptied in turn.

It is advantageous if the supply means are provided with a mixing device for mixing the sludge and refuse.

In order to achieve minimum space requirement and ease of accessibility to all parts it is expedient if the supply means for the refuse are provided with the following housed one underneath the other in vertical direction: metal-removing means, comminuting and breaking means, refuse ventilating means and means for removing glass and bottle tops.

It is advantageous if the supply means for the sludge are provided with a sludge silo which preferably has sludge ventilation.

In order to avoid rotatable pipe connections it is advantageous if the ventilation means are provided with at least one blower housed on the reception part.

It is expedient if the treatment chamber or at least part of the treatment chambers are adapted to be sealed on the side facing upwards and on the side facing downwards are provided with apertures and at least one blower in operative connection with the latter to supply air from the bottom upwards or to suck air from the bottom downwards through the material which is to be treated. It can also be expedient if the treatment chamber or at least part of the treatment chambers are adapted to be closed on the side facing upwards and are provided with at least one blower for supplying air from the top downwards through the material which is to be treated. To provide alternating ventilation of the material to be treated in different directions it is expedient in both cases if switching means are provided, the purpose of these being to ventilate the material which is to be treated periodically from the top downwards and periodically from the bottom upwards.

In order to prevent undesirable smells from developing it is expedient if connecting means are provided to guide the air which is passed through the material to be treated out of the latter after it has emerged to an earth filter.

The invention is explained by way of example below with the help of the drawings in which:

FIG. 1 shows a ground plan of a first embodiment of a refuse and sludge treatment plant in accordance with the invention;

FIG. 2 shows a side view of the plant shown in FIG. 1;

FIG. 3 shows on an enlarged scale a section along the line III — III in FIG. 1;

FIG. 4 shows on an enlarged scale a section through a second embodiment having a modified treatment chamber;

FIG. 6 shows a side view of the plant shown in FIG. 5.

Figure 5:
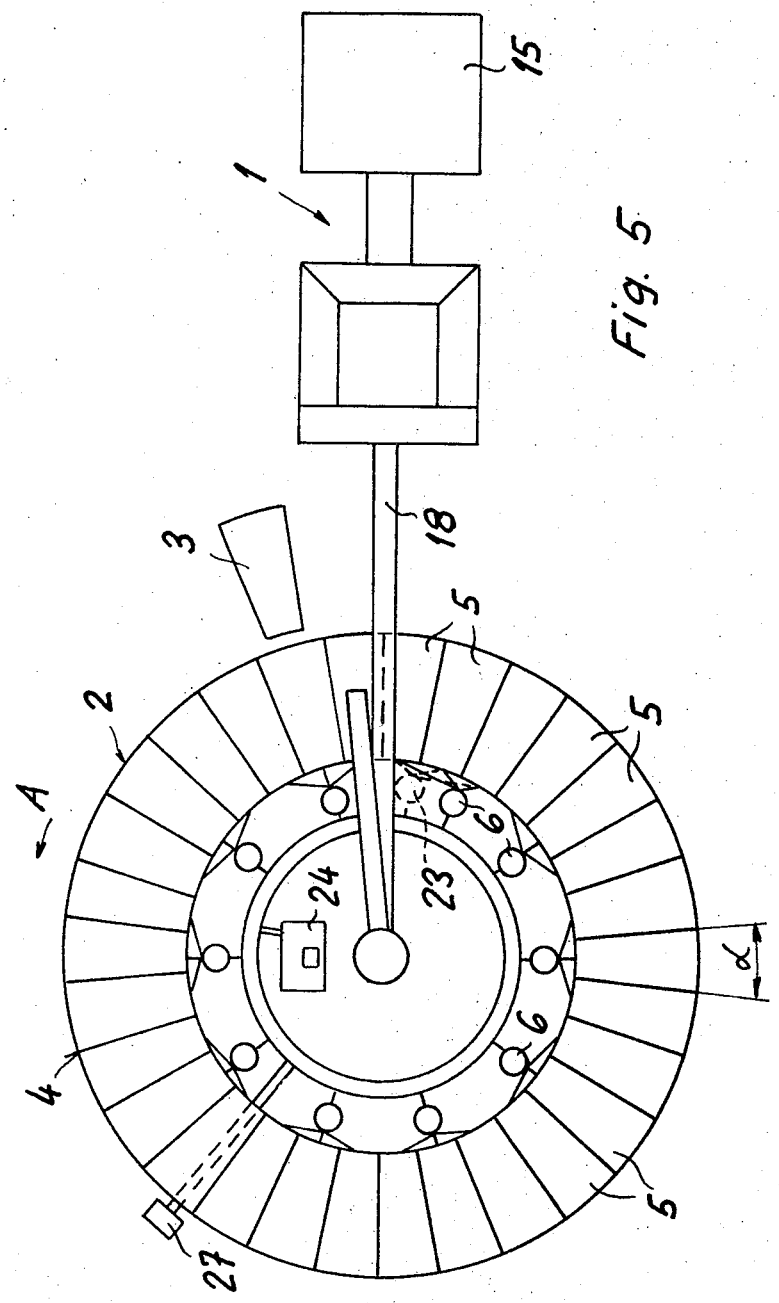
FIG. 5 shows a ground plant of a third embodiment of a sludge and refuse treatment plant according to the invention.

The refuse and sludge treatment plant shown in FIGS. 1 to 4 is provided with supply means 1 for supplying the sludge and refuse to be treated to a treatment device 2 and with removal means 3 for removing material which has been treated in the treatment device 2. Treatment device 2 has a reception part 4 adapted to rotate around a vertical axis with a plurality of treatment chambers 5 housed one behind the other in its direction of rotation A and extending in the latter to receive the sludge and refuse to be treated. In order to ensure the biological decomposition in the material for treatment located in the treatment chambers 5, the treatment chambers 5 are connected with blowers 6 to ventilate the material to be treated. The removal means 3 are so arranged that they remove the treated material at a point which is approximately 360° removed in the direction of rotation A of the reception or support member 4 seen from the position of supply of the supply means 1 out of the individual treatment chambers 5.

In order to achieve minimum space requirement (seen in the ground plan of the plant) and ease of accessibility to all parts the supply means for the refuse are provided with the following, which are arranged one underneath the other in vertical direction: first metal-removing means 7, coarse comminution and breaking means 8, second metal-removing means 9, a refuse ventilating arrangement 11 provided with a blower 10, a further comminuting arrangement 12 and means 13 for removing glass and bottle tops.

The supply means for the sludge coming from a clarification plant has a sludge silo 15 fitted with sludge ventilation means 14. To mix the sludge and refuse in a specific mixture ratio the supply means 1 are provided with a mixing device 16.

Drive means can be provided to drive the support member 4 in order that the latter rotates intermittently i.e. step by step, at each step through an angle of rotation α corresponding to one distance between treatment chambers. As support member 4 can however have for example a diameter of approximately 30 m and weigh about 100 tons by itself, it is expedient if the drive means rotates the support member 4 continuously around a vertical axis of rotation.

If for example support member 4 has thirty treatment chambers 5, then when support member 4 is driven intermittently and the material to be treated remains in treatment chambers 5 for 12 days, then each of the chambers 5 is at a standstill during two forward Movements for approximately 9½ hours, in other words rather more than one working day.

As treatment chambers 5 are housed in circular formation on support member 4, operating and machine space 17 for the plant can be provided inside the circle. As this arrangement means that the machine space and therefore the blowers 16 can be rotated with a view to ventilating the treatment chambers 5 together with the latter, then there are no connection problems which would otherwise occur if the blowers 6 were mounted on a stationary part.

The operating and machine area 17 can also of course be arranged to be stationary.

As can be seen from FIG. 3, the treatment chambers 5 are adapted to be sealed air-tight on the side facing upwards by means of cover 19, and on the side facing downwards they are provided with apertures 20 and a blower 6 connected to the latter to supply air from the bottom upwards or to suck air from the bottom downwards through the material 21 which is to be treated. Part of the treatment chambers 5 can, as is seen from FIGS. 1 and 3, be connected in their upper part via a connecting pipe 22 with at least one further blower 23 to supply air from the top downwards through the material 21 for treatment. In this way it is possible to provide switching means, the effect of this being that the material 21 for treatment has air passing through it periodically from the top downwards, which has the effect of compacting the latter, and then from the bottom upwards for a specific time, this resulting in the material 21 for treatment being loosened.

The mixture of sludge and refuse for treatment is poured by means of the supply part 18 of supply means 1 fitted with a helical conveyor into the individual treatment chambers 5, where it stays for approximately 12 days during the rotation of the reception or support member 4 by approximately 360° until it reaches the removal arrangement 3. During this time the mixture of sludge and refuse rests in the individual treatment chambers 5 uninterrupted and is ventilated as described above. During this time the bacteria to be found in this mixture develop a temperature of approximately 75° to 85° Celsius, with the result that the material 21 for treatment becomes sterile and an earth-like substance results.

The air which is heated by the biological process can then be used to heat water, and in this connection it is possible that water heated in this way can be further heated in a combustion plant 24 intended for sealing material for a further 24 hours, and then used further for any purpose.

In order that the consumed and unpleasantly-smelling air does not pass immediately to the open air after flowing through the material 21 for treatment, there is provided a connecting pipe which is connected to a circular connecting pipe 25, which leads this air to an earth filter 27 which removes the unpleasant smells therefrom. The earth filter can also be housed in its own chamber 5 intended for this purpose.

The removal means 3 are provided with a platform which is adapted to be displaced under the floor part of the treatment chamber 5 which is in the removal position, with the help of which the floor part together with the earth substance located thereon is raised and can then be moved outwards radially. The earth substance is then subjected to supplementary treatment, packed and sent off to the consumer.

As can be seen from FIG. 4, treatment chambers 5 may be open at the side facing upwards and be fitted on the side facing downwards with apertures 20 and a suction fan in operative connection therewith.

It is also possible to provide a single circular treatment chamber instead of a plurality of treatment chambers 5, in which case the material for treatment is poured in and removed in sections.

The plant which has been described can be operated on a fully-automatic basis and is relatively simple to design and maintain.

The plant shown in FIGS. 5 and 6 corresponds to the plant shown in FIGS. 1 and 2 with the difference that in the latter the treatment device 2 provided with treatment chambers 5 is housed stationary and the supply member 18 is adapted to rotate around the middle axis of the reception part 4, being adapted to move together with the removal means 3 in the direction of the arrow A along the reception member 4. Removal means 3 are so housed in this way that they move the material for treatment out of the individual treatment chambers 5 to a position which is approximately 360° from the supply position of supply means 1 in the direction of the arrow A.

In order to move the supply and removal means along the circular-shaped reception member 4 drive means are provided for step wise displacement of the latter at each step by an angle α corresponding to one of the distances between treatment chambers.

If reception member 4 has for example, 30 treatment chambers 5, then in the case of intermittent forward propulsion of the supply and removal means and given a residence time by the material for treatment in the trestment chambers 5 of 12 days the supply and removal means are in the working range of the same treatment chamber during two forward movements for approximately 9½ hours, in other words more than one working day.

The mixture of sludge and refuse which is to be treated is poured into the individual treatment chambers 5 through the supply member 18 of supply means 1 provided with a screw conveyor, where it spends approximately twelve days while the supply and removal means move jointly in the direction of the arrow A by approximately 360°. During this time the mixture of the refuse and sludge rests quietly in the individual treatment chambers 5 and is ventilated, as has already been described.

I claim:

1. Garbage- and disposal plant with feeding means for feeding such material to be treated into a processing unit and with discharge means for discharging such treated material in the processing unit, which plant further comprises a circular support part (4);

a plurality of processing chambers (5) arranged in the circumferential direction of, and extending into, said supporting part, which chambers are individually adjustable and are connected at one end thereof to at least one fan for the individual passage of a gas enhancing a biological process, in vertical direction through such material to be treated, said feeding and discharge means being movable along the circular supporting part (4) relative to each other, in rigid correlation to each other, in such a way that the discharge means (3) convey treated material out of said processing chamber (5) at a single point remote from the individual feeding points, seen in the direction of rotation.

2. Plant according to claim 1, wherein said supporting part (4) is rotatably mounted.

3. Plant according to claim 1, in which said feeding means are connected to a sludge silo (15) provided with a sludge ventilation system (14).

4. Plant according to claim 2, further including driving means for the continuous rotation of said supporting part (4) about a vertical axis of rotation.

5. Plant according to claim 1, wherein said supporting part (4) is provided with a plurality of processing chambers (5) arranged in succession in its circumferential direction and extending in the latter, said supporting part having driving means for the stepwise rotation of the supporting part by an angle of rotation (alpha) corresponding to the interval of said processing chambers.

6. Plant according to claim 2, in which said ventilation means (7) includes at least one fan (18) arranged on said supporting part (4).

7. Plant according to claim 1, wherein said processing chambers (5) are open on their upwardly directed side and are provided on their downwardly directed side with openings, at least one suction fan being in operative connection with said openings.

8. Plant according to claim 1, in which at least a part of said processing chambers (5) are closable on their upwardly directed sides and are provided on their downwardly directed sides with openings (20) and at least one fan (6) in operative connection with the latter for conveying air from the bottom to the top and for exhausting air from the top to the bottom through material (21) undergoing treatment.

9. Plant according to claim 1, wherein at least a part of the processing chambers (5) are closable on their upwardly directed sides and are provided with at least one fan for conveying air from the top to the bottom through material undergoing treatment.

10. Plant according to claim 8, which further includes reversing means having the effect that material undergoing treatment ventilated at times from the top to the bottom and at times from the bottom to the top.

11. Plant according to claim 8, which further includes reversing means having the effect that material undergoing treatment is ventilated at times by compressed air supplied above the latter, and at times from the top to the bottom by means of an underpressure produced below the latter.

12. Plant according to claim 1 characterized in that the receiving part (4) is provided with a plurality of processing chambers (5) arranged in succession in its circumferential direction and extending in the latter, and that connecting means are provided which feed the air conducted through the material to be treated, after issuing from the latter, to an earth filter arranged in a chamber (5) secured on the receiving part (4).

13. Plant according to claim 1, characterized in that the receiving part (1) is provided with a plurality of processing chambers (5) arranged in succession in its circumferential direction and extending in the latter, and that each of the processing chambers (5) is provided for emptying with a bottom part moving in radial direction of the supporting part (4).

* * * * *